(12) United States Patent
Fliger et al.

(10) Patent No.: US 9,360,739 B2
(45) Date of Patent: Jun. 7, 2016

(54) PHOTOGRAPHIC AND VIDEO MOUNTING PLATE WITH DEPLOYABLE ATTACHMENT POINT

(71) Applicants: David Fliger, Minneapolis, MN (US); Lynn Fliger, Minneapolis, MN (US)

(72) Inventors: David Fliger, Minneapolis, MN (US); Lynn Fliger, Minneapolis, MN (US)

( * ) Notice: Subject to any disclaimer, the term of this patent is extended or adjusted under 35 U.S.C. 154(b) by 0 days.

(21) Appl. No.: 14/093,095

(22) Filed: Nov. 29, 2013

(65) Prior Publication Data

US 2014/0158845 A1  Jun. 12, 2014

Related U.S. Application Data

(60) Provisional application No. 61/732,211, filed on Nov. 30, 2012.

(51) Int. Cl.
| | |
|---|---|
| *G03B 17/56* | (2006.01) |
| *F16M 11/04* | (2006.01) |
| *F16M 13/00* | (2006.01) |
| *F16M 13/04* | (2006.01) |

(52) U.S. Cl.
CPC ........... *G03B 17/561* (2013.01); *F16M 11/041* (2013.01); *F16M 13/00* (2013.01); *F16M 13/04* (2013.01); *G03B 17/56* (2013.01); *G03B 17/566* (2013.01)

(58) Field of Classification Search
CPC .... G03B 17/56; G03B 17/561; G03B 17/566; F16M 13/04; F16M 11/041
USPC ........................................... 248/177.1, 187.1
See application file for complete search history.

(56) References Cited

U.S. PATENT DOCUMENTS

| | | | | | |
|---|---|---|---|---|---|
| 2,732,236 | A | * | 1/1956 | Bretthauer | 292/65 |
| 3,356,325 | A | * | 12/1967 | Schnase | 248/187.1 |
| 3,437,029 | A | * | 4/1969 | Rydstedt | 294/139 |
| 4,530,580 | A | * | 7/1985 | Ueda et al. | 396/425 |
| 4,545,660 | A | * | 10/1985 | Rudolf | 396/425 |
| 4,648,698 | A | * | 3/1987 | Iwasaki | 248/163.1 |
| 4,751,540 | A | * | 6/1988 | Jones | 396/419 |
| 4,899,189 | A | * | 2/1990 | Frost | 396/419 |
| 4,929,973 | A | * | 5/1990 | Nakatani | 248/177.1 |
| 5,081,478 | A | * | 1/1992 | Hayashida | F16M 11/04 |
| | | | | | 284/187.1 |
| 5,128,701 | A | * | 7/1992 | Hampton | 396/420 |
| 5,332,183 | A | * | 7/1994 | Kagayama | B62J 11/00 |
| | | | | | 224/420 |
| 5,350,147 | A | * | 9/1994 | Paganus | 248/346.2 |
| D357,493 | S | * | 4/1995 | Yotsuya | D16/244 |
| 5,738,328 | A | * | 4/1998 | O'Farrill | 248/500 |

(Continued)

FOREIGN PATENT DOCUMENTS

| | | | | | |
|---|---|---|---|---|---|
| DE | 1172532 | | * | 6/1964 | |
| GB | 2507977 | A | * | 5/2014 | F16M 11/10 |

(Continued)

*Primary Examiner* — Terrell McKinnon
*Assistant Examiner* — Eret McNichols
(74) *Attorney, Agent, or Firm* — Geiser Law, PLLC; Greg N. Geiser

(57) ABSTRACT

A mounting plate for securing a photographic and video device to a stabilizing element. The mounting plate is affixed to the device using a fastener and includes a deployable attachment member movable between a retained position and deployed position. In the retained position, the mount is usable and attachable to a stabilizing element. In the deployed position, the mount is attachable to a strap or similar element using the attachment member. The device allows a user to easily and quickly affix the mount to both a strap and a stabilizing element.

7 Claims, 5 Drawing Sheets

(56) References Cited

U.S. PATENT DOCUMENTS

| | | | |
|---|---|---|---|
| 6,196,504 B1 * | 3/2001 | Lemke | 248/187.1 |
| 6,752,369 B1 * | 6/2004 | Cameron | 248/500 |
| 6,779,932 B2 * | 8/2004 | DeSorbo et al. | 396/419 |
| 7,185,862 B1 * | 3/2007 | Yang | 248/187.1 |
| D576,659 S * | 9/2008 | Bevirt | D16/245 |
| 7,866,899 B2 * | 1/2011 | Kope et al. | 396/423 |
| 7,871,205 B2 * | 1/2011 | Inoue | 396/422 |
| 8,280,242 B2 * | 10/2012 | Young et al. | 396/544 |
| 8,393,104 B1 * | 3/2013 | Moody | F41C 23/14 42/71.01 |
| 8,477,240 B2 * | 7/2013 | Kang | 348/375 |
| 8,568,041 B2 * | 10/2013 | Cherubin | 396/428 |
| 8,579,522 B2 * | 11/2013 | Geller | 396/420 |
| 8,683,663 B2 * | 4/2014 | Geller | 24/302 |
| 8,727,642 B1 * | 5/2014 | Tse et al. | 396/419 |
| 8,821,044 B1 * | 9/2014 | Dordick | 396/423 |
| 8,827,219 B2 * | 9/2014 | Kessler et al. | 248/187.1 |
| 8,876,070 B2 * | 11/2014 | Liu et al. | 248/188.6 |
| 8,950,956 B2 * | 2/2015 | Hale et al. | 396/423 |
| 8,985,877 B1 * | 3/2015 | Brewer et al. | 396/419 |
| 9,020,335 B2 * | 4/2015 | Swaggart | 396/155 |
| 9,249,923 B2 * | 2/2016 | DiCarlo | F16M 13/02 |
| 2007/0053680 A1 * | 3/2007 | Fromm | 396/420 |
| 2007/0147829 A1 * | 6/2007 | Teratani | 396/428 |
| 2007/0278366 A1 * | 12/2007 | McGill | 248/176.3 |
| 2009/0041453 A1 * | 2/2009 | Lloyd | 396/544 |
| 2011/0007207 A1 * | 1/2011 | Corticelli | 348/373 |
| 2011/0142436 A1 * | 6/2011 | Eynav | 396/420 |
| 2011/0280566 A1 * | 11/2011 | Cherubin | 396/428 |
| 2012/0008309 A1 * | 1/2012 | Hale | 362/105 |
| 2012/0048901 A1 * | 3/2012 | Wong et al. | 224/257 |
| 2012/0061439 A1 * | 3/2012 | Wallis | 224/600 |
| 2012/0106944 A1 * | 5/2012 | Johnson | 396/428 |
| 2013/0101280 A1 * | 4/2013 | Xu | 396/423 |
| 2013/0195437 A1 * | 8/2013 | Chamberlayne | 396/420 |
| 2014/0226962 A1 * | 8/2014 | Henry | 396/423 |
| 2015/0305461 A1 * | 10/2015 | Su | G06F 1/1628 224/191 |

FOREIGN PATENT DOCUMENTS

| | | | |
|---|---|---|---|
| WO | WO 2012024880 A1 * | 3/2012 | |
| WO | WO 2012093837 A2 * | 7/2012 | |
| WO | WO 2013155350 A1 * | 10/2013 | |

* cited by examiner

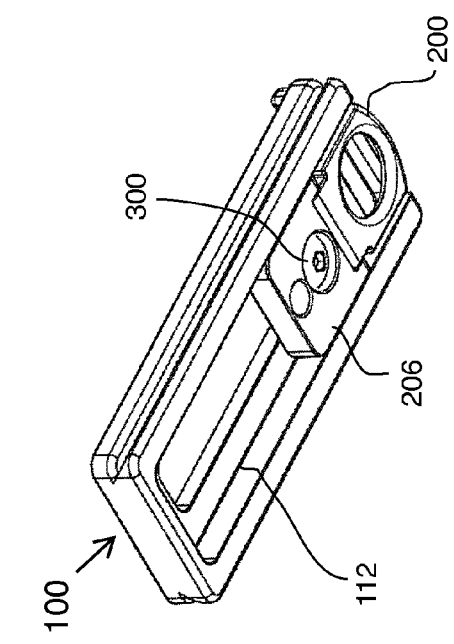
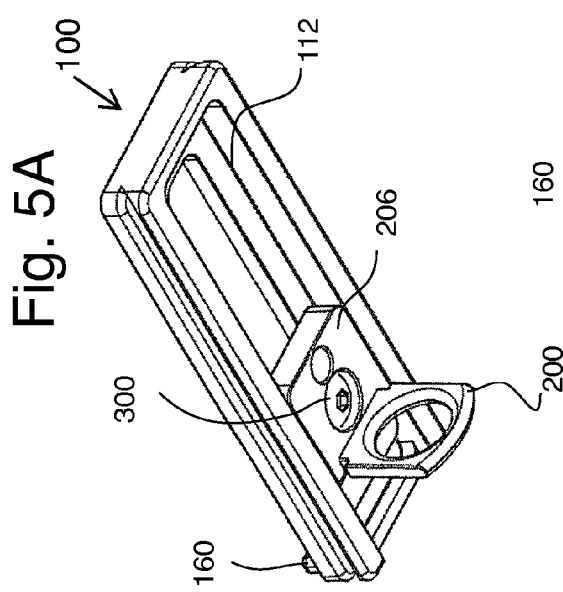
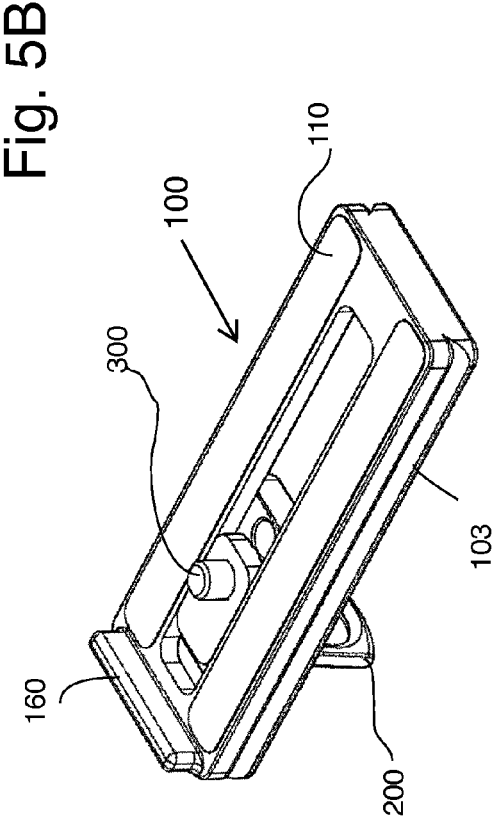

PHOTOGRAPHIC AND VIDEO MOUNTING PLATE WITH DEPLOYABLE ATTACHMENT POINT

CROSS REFERENCE TO RELATED APPLICATIONS

This application claims priority to U.S. Provisional Patent Application No. 61/732,211 filed Nov. 30, 2012 to the above named inventors.

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

The present invention relates to a mounting plate for attachment to photographic and video devices for receipt on a stabilizing element and use with an attachment strap.

BACKGROUND OF THE INVENTION

Users of devices such as cameras, spotting scopes, video recorders, lenses, lighting units, and other similar equipment, that require stabilization for ease of use, often removably affix the device to a stabilizing element, such as a tripod, monopod, or permanent mount. Often, to affix the device to the stabilizing element a mounting plate is used. This mounting plate is removably affixed to the device using an attachment means that is received within a corresponding coupling on the stabilizing element. Often, the mounting plate is affixed to the device using a threaded socket located on the bottom of the device body. Typically, this threaded socket is a ¼ inch diameter 20 threads per inch tap or ⅜ inch diameter 16 threads per inch tap for receipt of a male threaded fastener in communication with the mounting plate. This fastener is then screwed into the threaded socket securing the mounting plate to the device body. The mounting plate is then received within a coupling on the stabilizing element securing the device.

Often when utilizing the device, the user will employ a strap, sling, lanyard, harness or other similar element to secure the device to their person during use. Several popular straps utilize the threaded socket to attach a ring to the device body that can then be utilized to attach the strap using a clip or carabineer style fastener. This style of strap attachment provides a secure, stable, durable, and preferred connection between the device and the strap. However, as the ring in this style of strap attachment utilizes the threaded socket of the device this style of strap attachment cannot be used in combination with a mounting plate. Accordingly, a user is required to remove the strap and ring from the threaded socket of the device to attach a mounting plate. Therefore, there is a need for a device that combines the benefits of a mounting plate with the security and strength of a fixed attachment point located on the bottom of the camera body.

SUMMARY OF THE INVENTION

A mounting plate is disclosed for attachment to photographic and video devices for securing the device to a stabilizing element, such as a tripod, a monopod, or a permanent mount. The mounting plate is designed for removable attachment to a threaded socket of the device and includes a recess on a bottom side containing a hinged deployable attachment member. The attachment member is movable between a retained position and a deployed position. In the retained position the attachment member is nested within the recess of the mounting plate, wherein the function and performance of the mounting plate is not hindered by the presence of the attachment member. In the deployed position the attachment member provides a secure and durable attachment point for a strap, lanyard, sling, harness, or other similar securing component.

Preferably, the attachment member is restrained in position by a compliant member providing resistance during movement between the retained and deployed positions and to provide a durable tactile feel during deployment. This compliant member may be a compression spring, torsion spring, or other flexible member that provides resistance to movement of the attachment member. The attachment member further contains an aperture sized to receive a clip, snap, connector, carbineer, or other similar securing element for attachment to a strap.

In use, a user will mount the mounting plate to the device body utilizing a fastener for receipt into the threaded socket of the device. For use on the stabilizing element, the user will move or ensure the attachment member is in its retained position. The mounting plate can then be secured and received within the stabilizing element to secure and stabilize the device. To use the disclosed mounting plate with the strap, the user will deploy the attachment member to the deployed position. The user will then affix the strap to the deployed attachment member aperture using a clip or other similar connector. The user can secure the device to their person using the strap. To move between the deployed position and the retained position the user will remove the strap and move the attachment member to the retained position. The steps are reversed to secure the device to a strap.

BRIEF DESCRIPTION OF THE SEVERAL VIEWS OF THE DRAWING (S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein:

FIG. 5A is an isometric view of the bottom side of an alternate embodiment of the mounting plate with the deployable attachment member fully deployed, according to the present invention;

FIG. 5B is an isometric view of the bottom side of an alternate embodiment of the mounting plate with the deployable attachment member retained, according to the present invention;

FIG. 5C is an isometric view of the top side of an alternate embodiment of the mounting plate with the deployable attachment member fully deployed, according to the present invention.

DETAILED DESCRIPTION OF THE INVENTION

Figure 1:
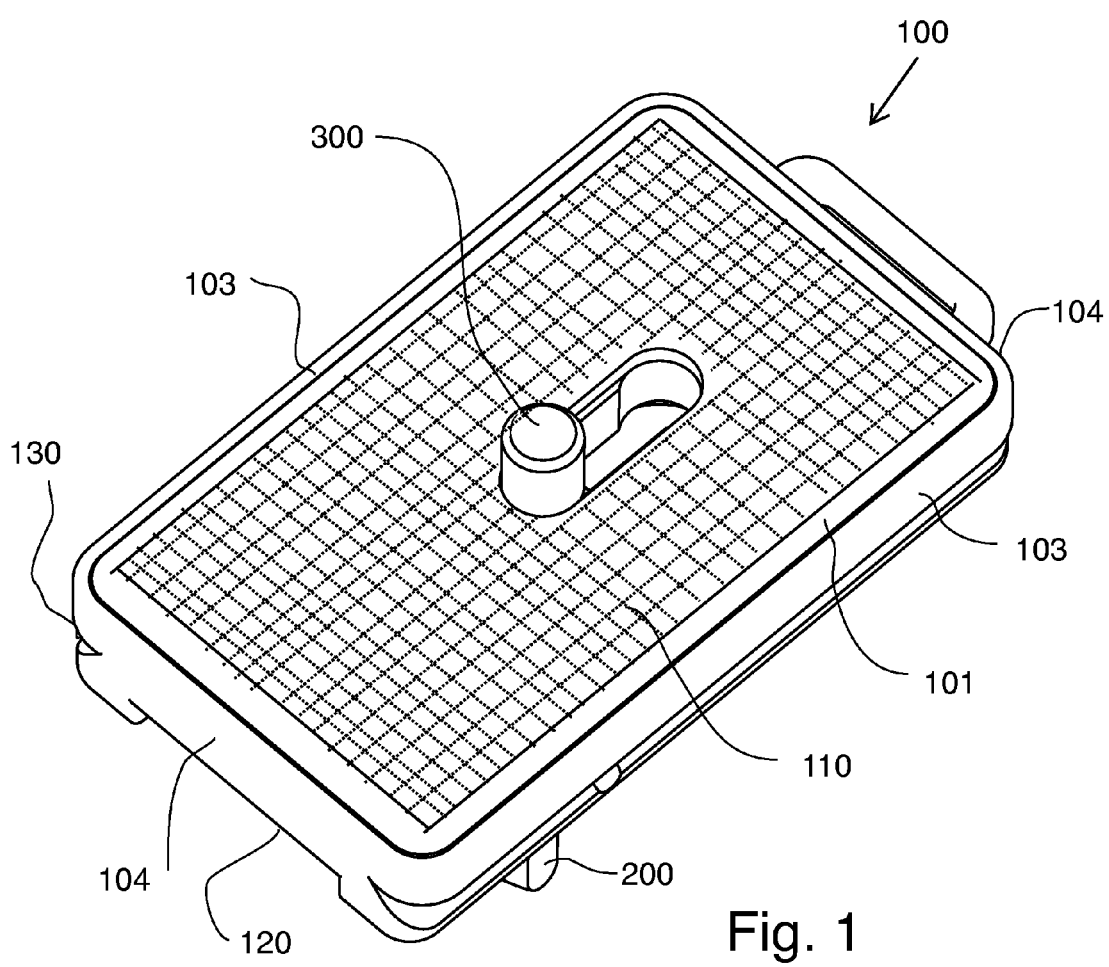
FIG. 1 is an isometric view of the top side of the photographic and video mounting plate with the deployable attachment member fully deployed, according to the present invention.
Figure 2:
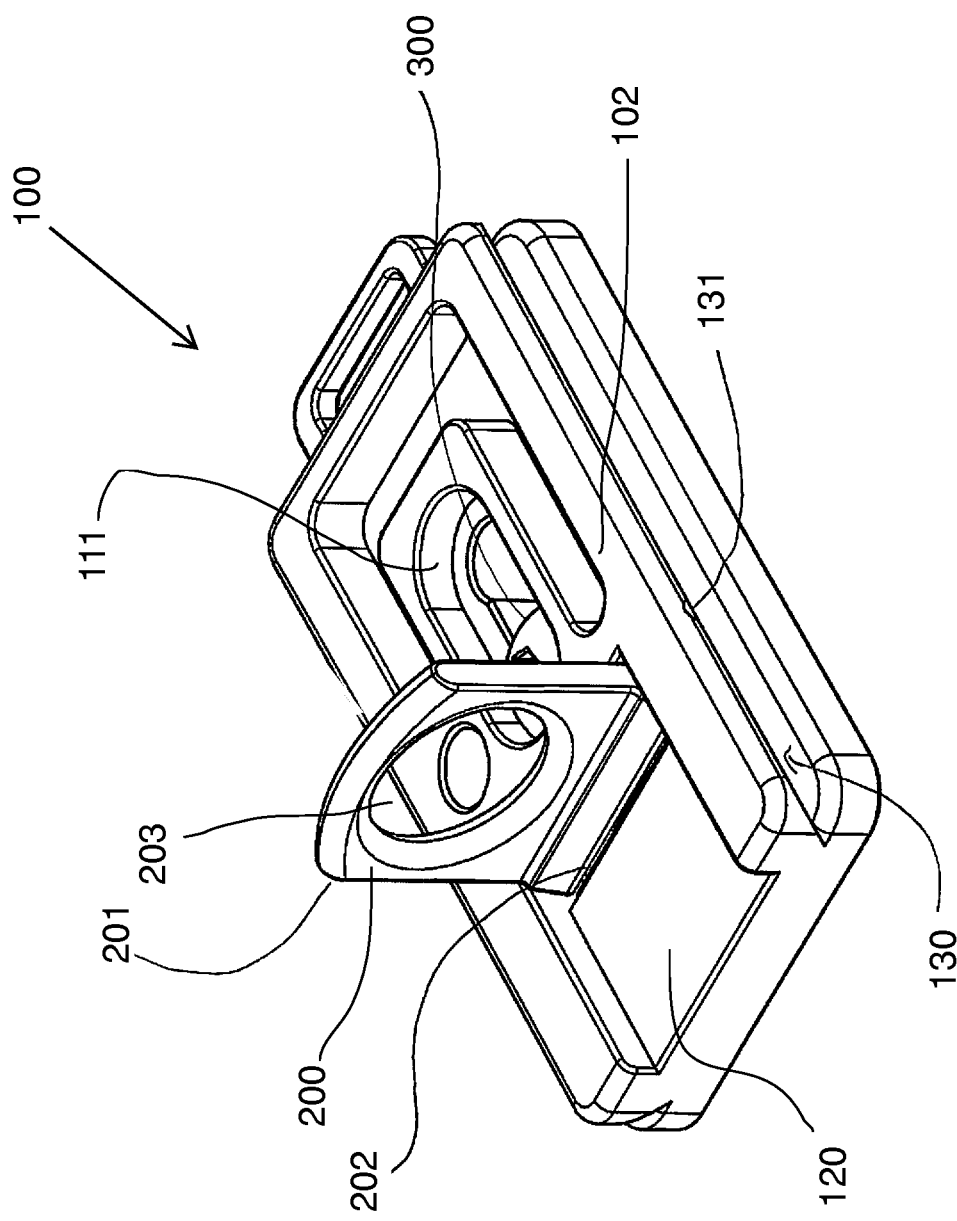
FIG. 2 is an isometric view of the bottom side of the mounting plate with the deployable attachment member fully deployed, according to the present invention.
Figure 3:
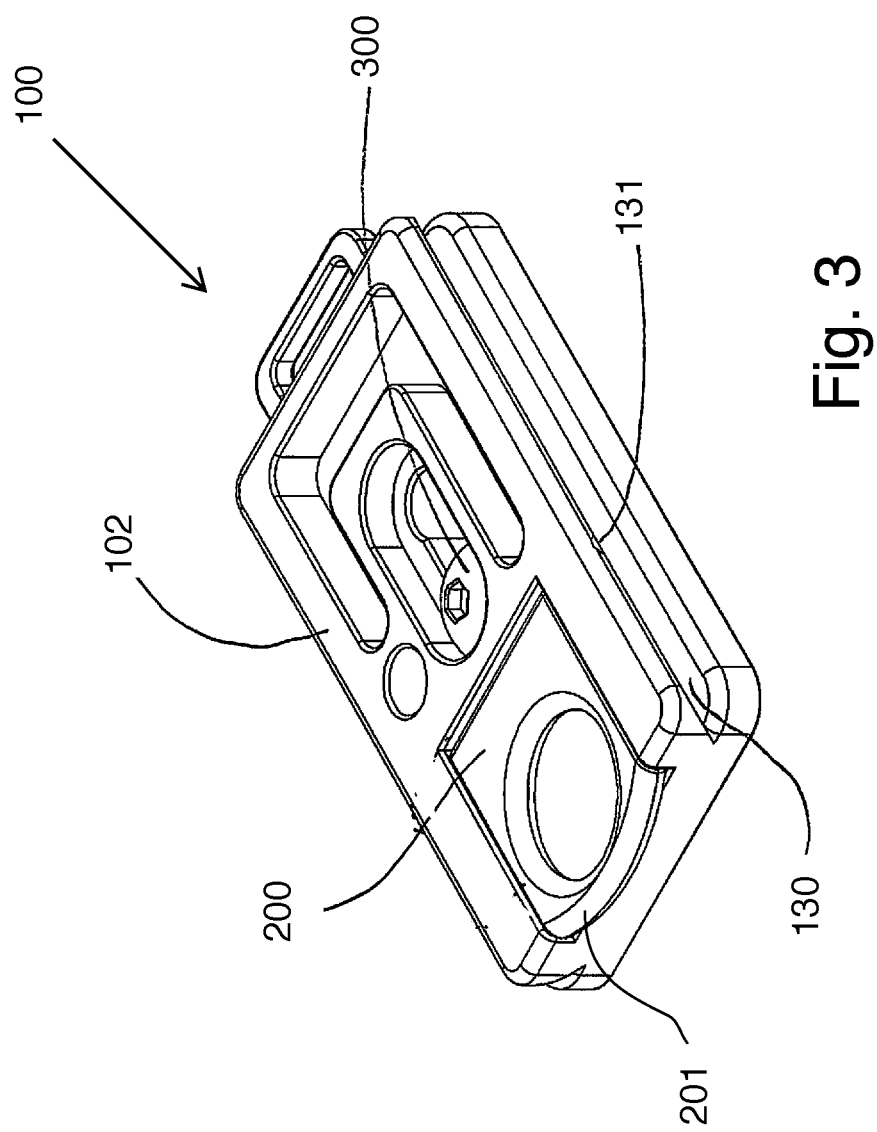
FIG. 3 is an isometric view of the bottom side of the mounting plate with the attachment member retained, according to the present invention.

Referring now to FIG. 1-3, isometric top and bottom views of a mounting plate 100 designed for engagement with photographic and video devices and with a deployable attachment member 200, according to the present invention. The mounting plate 100 includes the deployable attachment member 200 and a fastener 300. The mounting plate 100 is designed for receipt within a stabilizing element when the deployable attachment member 200 is in a retained position and for attachment to a strap or other similar element when the deployable attachment member 200 is in a deployed position. This enables the mounting plate 100 to be utilized for multiple purposes while engaged with the photographic or video device.

The mounting plate 100 has a top side 101, a bottom side 102, a pair of opposed sidewalls 103 defining a length, and a pair of opposed edges 104 defining a width and having a thickness between the top side 101 and bottom side 102. The pair of opposed sidewalls 103 includes a flanged portion 130. The flanged portion 130 forming a groove in the opposed sidewalls 103 for receipt of the mounting plate 100 within a corresponding clamp on the stabilizing element. Preferably, this flanged portion 130 is a dovetail groove with a sloped edge to be received within an corresponding clamp, such as the quick release system developed by camera equipment maker ARCA-SWISS. The ARCA-SWISS, or ARCA-type clamp utilizes a dovetail tenon receiver with a sloped edge of approximately 45 degrees for stable and secure receipt of clamped items.

To further secure the mounting plate 100 to the device, the mounting plate 100 top side 101 includes a gripping surface 110. This surface is preferably a rubber type surface with striations to improve adhesion to the device and prevent slippage of the device while it is in engagement with the mounting plate 100.

The mounting plate 100 bottom side 102 includes a recess 120. The recess 120 is sized and shaped to correspond to the dimensions of the deployable attachment member 200 and allow the deployable attachment member 200 to nest within the recess 120. Accordingly, the recess 120 has a depth corresponding to the thickness of the deployable attachment member 200, wherein the deployable attachment member 200 is received within the recess 120 flush with the bottom side 102. Preferably, the recess 120 is defined by three walls to form a cavity with an opening on the edge 104 of the mounting plate 100 allowing the deployable attachment member 200 to extend beyond the edge 104. This allows the user to easily grasp the deployable attachment member 200 from the mounting plate 100.

The deployable attachment member 200 is hingedly connected to the mounting plate 100 and has a free end 201, a retained end 202, and an aperture 203. The retained end 202 is hingedly secured within the recess 120 and is adjacent to a pivot point of the deployable attachment member 200. The free end 201 is opposite the retained end 202 extending distal from the pivot point of the hinged connection. The aperture 203 is sized to receive a clip, carabineer, snap, hook, connector or other similar securing means.

Preferably, the deployable attachment member 200 is secured within the recess 120 using a pin (not pictured). The pin is inserted through a bore 131 located in the sidewall 103 and aligned with a through hole (not pictured) in the attachment member 200. Although a hinge pin is the preferred attachment mechanism to secure the attachment member 200 within the recess 120 of the mounting plate 100, other similar securing means, such as a raised detent and corresponding aperture, snap fit, compression fit, or traditional hinge may be used.

The fastener 300 is centrally located on the mounting plate 100 within a central aperture 111 to secure the mounting plate 100 top side 101 adjacent and flush to the device. The fastener 300 is designed to be received within a threaded socket or other similar attachment mechanism present on the device. Preferably the fastener 300 is a threaded screw for durability, compatibility, and strength of connection, although other similar securing means may be used.

Referring now to FIGS. 1-2, the attachment member 200 is shown in a deployed position. In this position, the mounting plate 100 is free from attachment with the stabilizing element. The attachment member 200 is available for use as an anchor point for the attachment of a strap, lanyard, sling, or other similar object. After use in this position, the strap or similar object can be removed, and the attachment member 200 placed into a retained position.

Referring now to FIG. 3, the device is shown with the attachment member 200 in the retained position. In this position, the attachment member 200 is shown flush with the mounting plate 100. The mounting plate 100 can then be affixed to a stabilizing element.

Referring now to FIGS. 4A-FIG. 4F, exploded side view of the hinged connection of multiple embodiments of the deployable attachment member 200 to the mounting plate 100, according to the present invention. The diagrams in FIGS. 2A-FIG. 2C represent the preferred connection of the attachment member 200 to the mounting plate 100. The attachment member 200 is movable between a retained position 210 and deployed position 211. The retained end 202 is secured to the mounting plate 100 using a pin 204. A torsion spring acts as a compliant member 205 to provide tension to the movement of the attachment member 200 and secure the attachment member within the desired position. In use, a user will grasp the free end 201 of the attachment member 200 and move the attachment member 200 between the retained 210 and deployed 211 positions. The movement of the attachment member 200 will bias the compliant member 205.

Figures 4A, 4B, 4C:
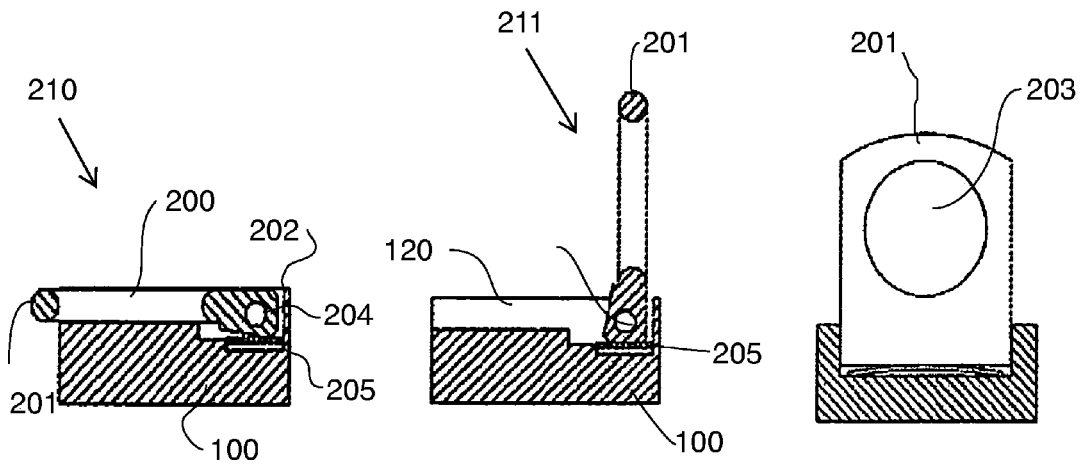
FIG. 4A is an isolated side view of the deployable attachment member in a retained position, according to the present invention.
FIG. 4B is an isolated side view of the deployable attachment member in a deployed position, according to the present invention.
FIG. 4C is an isolated front side view of the deployable attachment member in a deployed position, according to the present invention.
Figures 4D, 4E:
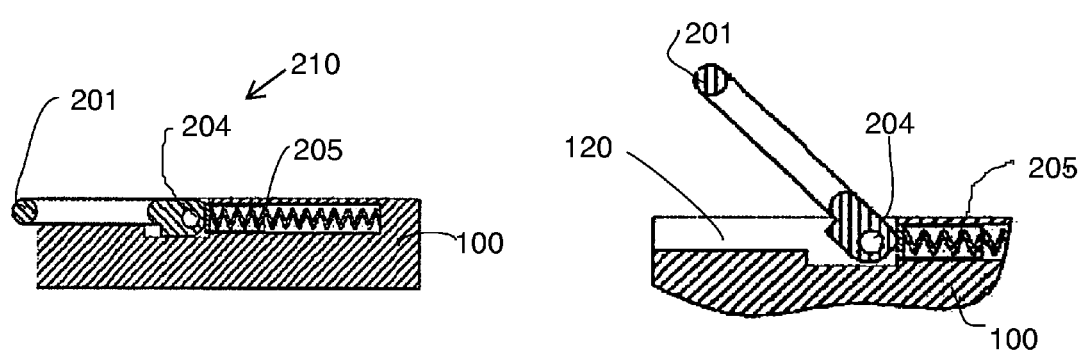
FIG. 4D is an isolated side view of an alternate embodiment of the deployable attachment member in a retained position, according to the present invention.
FIG. 4E is an isolated side view of an alternate embodiment of the deployable attachment member in a partially deployed position, according to the present invention.
Figure 4F:
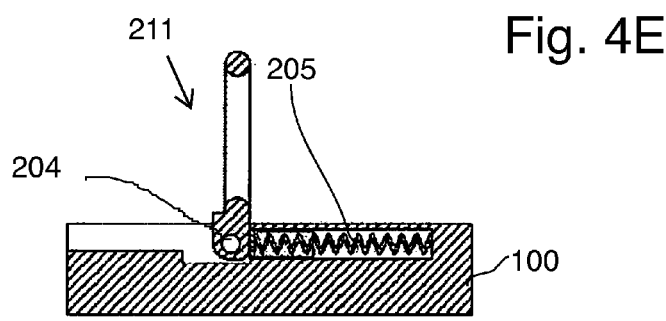
FIG. 4F is an isolated side view of an alternate embodiment of the deployable attachment member in a deployed position, according to the present invention.

In an alternate embodiment, as pictured in FIGS. 4D-FIG. 4F, the compliant member 205 is depicted as a compression spring received within a cavity of the mounting plate 100. In use, a user will grasp the free end 201 of the attachment member 200 and move the attachment member 200 between the retained position 210 and deployed position 211. The movement of the attachment member 200 will bias the compliant member 205.

Referring now to FIG. 5A-5C, an alternate embodiment of the device is shown. According to this embodiment, the deployable attachment member 200 is affixed to a moveable plate 206 slidably received within a channel 112 of the mounting plate 100 for attachment to the device using the fastener 300. According to this configuration, the mounting plate 100 can be adapted to be affixed to several types and sizes of devices, due to the movement of the moveable plate 206. Additionally, the mounting plate 100 may include a heal 160 extending vertical from the top side edge of the mounting plate 100. The heal 160 functions as a stop block preventing lateral rotation of the device when it is secured to the mounting plate 100.

This embodiment is particularly useful in attaching the mount to a tripod collar or tripod mount ring present on a large telephoto lens. As different lens manufactures have different mounting options, it is preferred that the mounting plate 100 be universal across all types and sizes of mounts.

In use, a user will mount the mounting plate 100 to the device body utilizing the fastener 300 for receipt into the threaded socket of the device. For use on a stabilizing element, the user will move or ensure the attachment member 200 is in its retained position 210. The mounting plate 100 can then be secured within a clamp on the stabilizing element to secure and stabilize the device. To use a strap or similar object, the user will deploy the attachment member 200 to the deployed position 211. The user will then affix the strap to the deployed attachment member 200 using a clip or other similar connector. The user can secure the device to their person using the strap. To move between the deployed position 211 and the retained position 210 the user will remove the strap and move the attachment member 200 to the retained position 210. The steps are reversed to secure the device to a strap.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the specification and the attached claims.

What is claimed is:

1. A mounting plate for removable attachment to a threaded socket of photographic and video devices, the mounting plate comprising:
    a top side, the top side in communication with the device;
    a bottom side, the bottom side opposite the top side, the bottom side having a recess, the recess sized for receipt of a deployable attachment member;
    the deployable attachment member having an aperture and hingedly coupled to the bottom side such that the deployable attachment member is hingedly received within the recess and movable between a retained position and a deployed position;
    a pair of opposed sidewalls, the sidewalls connecting the top side to the bottom side, the sidewalls each having a dovetail-shaped groove, each dovetail-shaped groove sized for receipt within a corresponding stabilizing element; and
    a fastener, the fastener sized for receipt within the threaded socket and wherein the fastener secures the mounting plate to the device.

2. The mounting plate as in claim 1, wherein the top side comprises a gripping surface.

3. The mounting plate as in claim 1, wherein each dovetail-shaped groove extends a length of the sidewall and is sized to be received in a clamp having opposed sloped edges for receipt within the dovetail-groove.

4. The mounting plate as in claim 1, wherein the deployable attachment member is hingedly connected using a compliant member.

5. A mounting plate for removable attachment to a threaded socket of photographic and video devices, the mounting plate comprising:
    a top side, the top side having a gripping surface in communication with the device;
    a bottom side, the bottom side opposite the top side, the bottom side having a recess, the recess sized for receipt of a deployable attachment member;
    the deployable attachment member having an aperture and hingedly coupled to the bottom side such that the deployable attachment member is hingedly received within the recess and movable between a retained position and a deployed position, the retained position being parallel and flush with the bottom side and the deployed position being perpendicular to a length of the mounting plate;
    a pair of opposed sidewalls, the sidewalls connecting the top side to the bottom side and extending the length of the mounting plate, the sidewalls each having a dovetail-shaped groove, each dovetail-shaped groove extending the length of each sidewall and forming a flange sized for receipt within a stabilizing element, the slope of the flange being approximately 45 degrees; and
    a fastener, the fastener sized for receipt within the threaded socket, wherein the fastener secures the mounting plate to the device.

6. The mounting plate as in claim 5, wherein each dovetail-shaped groove is sized to be received in an clamp having opposed sloped 45 degree edges for receipt within the dovetail-groove.

7. The mounting plate as in claim 5, wherein the deployable attachment member is hingedly connected using a compliant member.

* * * * *